United States Patent
Willard, Jr. et al.

[19]

[11] Patent Number: 6,022,434
[45] Date of Patent: Feb. 8, 2000

[54] RUN-FLAT TIRE HAVING PARTIAL CARCASS LAYERS

[75] Inventors: Walter Lee Willard, Jr., Greenville; Virginia White Snipes, Greer; Allen Eugene Wilson, Lexington, all of S.C.

[73] Assignee: Michelin Recherche et Technique S.A., Switzerland

[21] Appl. No.: 09/094,313

[22] Filed: Jun. 9, 1998

Related U.S. Application Data

[62] Division of application No. 08/691,831, Aug. 2, 1996, Pat. No. 5,795,416.

[51] Int. Cl.⁷ ................................................. B29D 30/08
[52] U.S. Cl. ................ 156/130.7; 152/517; 156/133; 156/135; 156/406.4
[58] Field of Search ................................. 156/111, 123, 156/130.7, 131, 132, 133, 135, 406.4; 152/517, 555, 550, 554, 548, 564, 541, 543

[56] References Cited

U.S. PATENT DOCUMENTS

| | | | |
|---|---|---|---|
| 3,509,929 | 5/1970 | Delobelle | 152/555 |
| 4,287,924 | 9/1981 | Deck et al. | 152/153 |
| 4,287,929 | 9/1981 | Huinink | 152/555 |
| 4,875,959 | 10/1989 | Kumagai | 156/123 |
| 5,238,040 | 8/1993 | Ghilardi | 152/517 |
| 5,267,595 | 12/1993 | Lampe | 152/525 |
| 5,368,082 | 11/1994 | Oare et al. | 152/517 |
| 5,427,166 | 6/1995 | Willard, Jr. | 152/517 |
| 5,435,370 | 7/1995 | Ahmad et al. | 152/548 |
| 5,762,740 | 6/1998 | Benzing, II et al. | 156/133 |

*Primary Examiner*—Geoffrey L. Knable
*Attorney, Agent, or Firm*—Alan A. Csontos; Robert R. Reed

[57] ABSTRACT

The run-flat tire of this invention includes a pair of bead regions, a crown region with a tread and a tread reinforcing package including a cap ply and self supporting sidewalls between each bead region and the crown region. An innerliner ply maintains air within the inflated tire. The self supporting sidewalls each include a first crescent-shaped reinforcing member, an inner carcass layer, an inner sidewall supporting complex and an outer sidewall and bead protecting complex. The supporting sidewalls effectively have a plurality of crescent-shaped reinforcing members and a plurality of carcass layers. The sidewall supporting complexes are realized by providing first and second partial carcass layers along with a filler rubber portion and a second crescent-shaped reinforcing member, which can be formed by a separate tire building operation. The sidewall protecting complexes can be formed in a similar operation. The run-flat tire of this invention can be realized within standard production rates for building tires. The inflated vs. deflated performance tradeoffs in ride comfort, handling, radial stiffness and endurance of the tire are substantially maintained with improved mass and rolling resistance over previous run-flat tires. This is accomplished with a run-flat tire having relatively small weight increases over a standard tire and with a rim that can be used interchangeably with the standard tire.

4 Claims, 8 Drawing Sheets

RUN-FLAT TIRE HAVING PARTIAL CARCASS LAYERS

This is a division of application Ser. No. 08/691,831, filed Aug. 2, 1996, now U.S. Pat. No. 5,795,416.

BACKGROUND OF THE INVENTION

1. Field of the Invention

The invention relates to a radial pneumatic tire and more specifically to an improved run-flat tire and method of assembling the run-flat tire during the manufacturing processes.

2. Description of the Prior Art

There is an ongoing effort by automobile manufacturers to eliminate the spare tire in order to reduce vehicle curb weight, increase available space within the vehicle and provide operator convenience. This is particularly true for vehicles having higher comfort specifications such as conventional luxury, family or urban-economy type vehicles. This effort has resulted in the development of pneumatic tires that are able to function for a limited time and distance at zero or near-zero inflation pressure, or commonly referred to as "run-flat" tires.

Run-flat tires have certain advantages over standard tires not designed to allow the vehicle to continue running with a loss of inflation pressure. Some of these advantages are follows:

1) It allows the driver the opportunity to find a more convenient time and location to change the flat tire.
2) It enhances the handling of the vehicle with sudden loss of inflation pressure.
3) It allows the driver the ability to avoid hazardous roadside situations.
4) The robust sidewalls increase the tire's resistance to puncture/rupture from road hazards (i.e., scrap metal, potholes) and curb impact.

Numerous variations of run-flat tires have been developed. These involve changes to the structure of the tire itself and modifications to the rim to hold and support the flat tire. Each variation is limited by safety restrictions on vehicle speed, length of travel, zero inflation pressure handling and the magnitude of the lateral accelerations that force the bead of the tire off the rim seat. Further, the best solutions are those which do not affect the vehicle's nominal performance. The inflated ride comfort and handling should not be compromised by the design of the run-flat tire. Therefore, the need for improvements in the design of run-flat tires continues.

A number of run-flat tire designs have been disclosed which yield acceptable and sometimes improved vehicle/tire performance. These design features include thickened tire sidewalls, sidewall reinforcing plies, tire bead seat and vehicle rim configuration modifications, tire sidewall to rim flange contact improvements and tire belt package edge modifications. Each of these features can be used to help improve run-flat performance. One successful design feature of run-flat tires is thickened sidewalls to support the vehicle after loss of inflation pressure. Such a thickened sidewall, as the tire is viewed in cross-section, has a plurality of crescent-shaped reinforcing members of rubber in the tire's sidewall. These reinforcing members are interposed in each sidewall along with or between a plurality of carcass layers. With a loss of the inflation pressure in the tire, the crescent-shaped reinforcing members combine with the carcass layers to prevent collapse of the tire's sidewall so that the tire can effectively support the vehicle using its reinforced sidewalls.

A number of patents disclose a thickened sidewall design feature including a plurality of reinforcing members and a plurality of carcass layers. These include U.S. Pat. Nos. 5,238,040; 5,368,082; 5,427,166; and 5,511,599, and European Patent (EP) No. 385,192.

In U.S. Pat. No. 5,238,040 three reinforcement inserts are interposed between first and second carcass plies. A third textile reinforcing strip to the inside of the thickened sidewall portion extends from the crown area of the tire to a mid-height of the sidewall. The third strip reduces possible rubbing friction to increase the time for the tire to fail due to temperature and crushing conditions.

The disclosure of U.S. Pat. No. 5,368,082 describes a run-flat tire with elastomeric first and second fillers and a carcass reinforcing structure with two plies from bead to bead having turnup ends wrapped around each bead. The second filler is between the first and second carcass plies. The turnup ends terminate in radial proximity of the maximum section width of the tire. A special flat base bead core keeps the tire seated on a rim after the difficulty in mounting the tire on the rim has been overcome.

The disclosures of U.S. Pat. Nos. 5,427,166 and 5,511,599 both include three carcass layers extending from bead to bead. A middle carcass layer has turned up portions around each bead core and is interposed between first and second crescent-shaped reinforcing members in each sidewall. A third reinforcing member is disclosed in U.S. Pat. No. 5,511,599 to extend radially outward from and contiguous with a bead filler.

In EP 385,192 a lenticular (crescent-shaped) section member disposed at the inside of the sidewall has a textile reinforcement insert. The insert divides the lenticular section member and extends radially outward from a side center line to as far as under the end of the belt. In another embodiment the insert extends from one end radially outward of a bead filler in one sidewall to the other end in a similar location in the other sidewall.

The manufacturing of run-flat tires having reinforced sidewalls involves the assembly of a large number of components when compared to a tire with no sidewall reinforcing members. The addition of crescent-shaped reinforcing members disposed with a plurality of carcass layers becomes very difficult and time consuming during the tire building process, especially when laying components on a tire building drum. In addition, carcass layers generally extend from bead to bead and may encircle the bead to wrap around the bead core and extend radially outward into the sidewall. These carcass layers result in further time delays and complexity in the building run-flat tires. A need exists to simplify the run-flat tire and the tire manufacturing process to maintain productivity at generally acceptable levels.

Tires with reinforced sidewalls as previously discussed may be simplified by truncating carcass layers in either or both the bead area and the crown area of the tire to provide partial. Typical patents which illustrate partial carcass layers include U.S. Pat. Nos. 4,067,372; 4,287,924; 5,164,029; 5,217,549; and 5,361,820, European Patent No. 385,192 and Japanese (JP) Patent No. 3-143710.

U.S. Pat. No. 4,067,374 discloses the use of a crescent-shaped sidewall reinforcing rubber portion positioned to the inside of partial carcass layers. The crescent-shape sidewall reinforcing member is put into compression while the cords of the partial carcass layers are put into tension with the loss of inflation pressure in the tire; thereby inhibiting collapse of the sidewall. The partial carcass layers each extend from a respective bead core to overlap the lateral edges of the belt. Partial carcass layers are formed by incorporating reinforcing fibers in a rubbery mixture. The other carcass layer is located to the inside of the reinforcing member and extends from bead to bead and is wrapped around each bead. This carcass layer would also be in tension with the loss of inflation pressure.

In U.S. Pat. No. 4,287,924 a two part crescent-shaped member has a heat conducting sheet or layer between the two parts. The layer extends over the whole height of the crescent-shaped portions and the two crescent-shaped parts are of different flexibility. The heat conducting layer may have parallel metallic cords extending radially to assist in the heat conductivity. The height of the disclosed tire of this patent is only 31 percent of its inflated height when the inflation pressure is zero.

In U.S. Pat. No. 5,164,029 carcass reinforcing layers are disposed on either one or both sides of a carcass. Reinforcing layers are partial layers extending from a lapping arrangement with the belt edge to a location outward of the bead core. A two component bead apex is further disclosed having a stiffener portion made of hard rubber and a buffer portion. The reinforcing layers and the bead apex help support the tire by increasing lateral and vertical spring coefficients of the tire. The tire of this patent improves the tire's vibration performance and provides only limited self supporting capability.

The pair of crescent-shaped elastomeric reinforcing members disclosed in U.S. Pat. No. 5,217,549 are preferably for high profile tires having a section height of 5 inches (127 millimeters) or greater. Sidewall stiffness is achieved by a single high modulus crescent-shaped reinforcing member in each sidewall to the inside of two carcass plies and a reinforced bias ply adjacent to the two carcass plies. The bias ply extends radially inward from each lateral edge of the belt to a location radially outward of the bead core and are bias at an angle of 60 degrees.

The radial tire disclosed in U.S. Pat. No. 5,361,820 includes a carcass layer composed of a single ply of carcass cords folded up around the bead core to an radial outward position below the belts. A hard rubber layer is disposed between the carcass layer and the folded-up portion to insure a high lateral spring constant to maintain good maneuverability. The tire of this patent has an improved production rate and a reduced tire weight when compared to other tires with a high lateral spring constant.

In EP 385,192 a textile reinforcement insert is positioned in the crown area of the tire and extends radially inward to divide a crescent-shaped reinforcing member. The insert stops at a distance radially outward of the bead core beyond the apex of the bead filler. The insert lies along the center axis of the crescent-shaped member. The crescent-shaped member also terminates at the radial outermost extent of the bead filler in this patent.

A cord reinforcing unit on the interior surface of the crescent-shaped reinforcing member in JP 3-143710 consists of at least one reinforced ply. The reinforcing member is to the inside of two carcass plies which wrap around the bead core. The inner reinforcing unit extends outward from a location above the bead core to a lapping arrangement with the belt layer. The reinforcing member and the reinforcing unit provides the overall sidewall support for run-flat performance. Only one crescent-shaped reinforcing member is illustrated.

Efforts to reduce the production time for building tires by improving the tire assembly processes are disclosed in U.S. Pat. Nos. 4,875,959; 5,088,539; 5,267,595; and 5,215,612. Improvements include forming methods for components of the tire, combining sidewall components and the efficient assembly of products on a tire building drum.

In U.S. Pat. No. 4,875,050 a tire forming method is disclosed for piling tire forming members one on another with their ends shifted to form a member assembly. Three separate components are formed, cut to length and joined together with high accuracy. The tire members thus joined together can be formed on a winding roller.

Sidewalls of the tire disclosed in U.S. Pat. No. 5,267,595 each have a two-layer structure disposed on the lateral outer sides of the carcass which extend from the bead rubber members to shoulder regions of the tire. The patent of U.S. Pat. No. 5,088,537 discloses a sidewall having a three-layer structure extending from the bead area to the tread. Each rubber layer can be made with different materials for the different performance criteria of the tire's sidewall. If one would consider the sidewall to have a single structure, instead of two or three separate components or layers in tire building process, the building of the tire could be simplified.

A typical method for manufacturing tires is illustrated and disclosed in U.S. Pat. No. 5,215,612. Portions of a green tire are assembled or formed by wrapping uncured tire components around a forming or tire building drum. A plurality of pieces or components are placed at both lateral sides of a continuous carcass ply which is subsequently wrapped around a bead core. In U.S. Pat. No. 5,215,612 the importance of bonding rubber pieces on the end of a sidewall rubber portions in building the tire is disclosed. This method becomes essential in reducing the tire's production time when a large number of sidewall components are present in the formation of the green tire on a building drum.

The references fail to teach how to improve the production time of a run-flat tire having a plurality of crescent-shaped reinforcing members and carcass layers. A desirable production capacity would be the ability to produce a run-flat tire having sidewall supporting capabilities in approximately the same time as a standard tire having no sidewall supporting capability. Tire manufacturing plants must be able to produce enough tires to meet the constant demand for tires that exists.

In accordance with the limitations of the references, one object of the present invention is to provide a simplified method for manufacturing run-flat tires having self supporting sidewalls with little change in production capability.

A further object of this invention is to provide a run-flat tire having sidewall components and carcass layers which result in a run-flat tire which can be easily manufactured. This run-flat tire is to include a reduction in the extent of components provided to make a run-flat tire without compromising the performance of the tire.

Another object of this invention is to provide a run-flat tire which can be constructed by conventional manufacturing techniques, requiring few additional manufacturing steps and procedures. Conventional manufacturing techniques are used to provide a cost effective run-flat tire produced at an improved rate of production when compared to present production rates for run-flat tires.

SUMMARY OF THE INVENTION

Space, weight, safety and convenience problems associated with spare tires are solved by run-flat tires. An object of this invention is to provide a run-flat tire which demonstrates improved vehicle performance under deflated conditions and yet achieves the same vehicle performance as a standard tire when inflated.

In particular, the tire of this invention includes an innerliner to the inside of said tire, a reinforced inner carcass layer that is anchored in bead regions by being looped around inextensible bead cores, a first crescent-shaped reinforcing member, a tread disposed in a crown portion of said tire and a tread reinforcing package disposed between said carcass layer and said tread. The tire further comprises respective inner sidewall supporting complexes each including at least one reinforced partial carcass layer and at least one crescent-shaped reinforcing member extending from a respective bead core to a lapping arrangement with a respective lateral edge of the tread reinforcing package. The tire also comprises respective outer sidewall and bead protecting complexes each disposed laterally to the outer sides of a respective inner sidewall supporting complexes and extending from a respective bead region to a respective edge of the tread for contacting the tread.

The tire of this invention may further include the inner sidewall supporting complexes each having two reinforced partial carcass layers, being first and second partial carcass layers, extending from a respective bead core to a lapping arrangement with a respective lateral end of the tread reinforcing package. In addition, the inner sidewall supporting complexes may include a filler rubber portion disposed between the two partial carcass layers to extend from the respective bead core to a lapping arrangement with the respective lateral end of the tread reinforcing package.

In another embodiment the present invention includes a tire for mounting on a rim of a vehicle capable of sustaining vehicle loads at a contact patch in an effective manner with a loss of inflation pressure. The tire includes a crown portion having a tread for contacting a ground surface, a tread reinforcing package located radially inward of said tread and a pair of bead regions axially spaced apart with a bead core located radially inward of said crown portion. The tire further includes a pair of axially spaced apart reinforced load bearing sidewalls each disposed radially between a respective lateral edge of said crown portion of the tire and a respective bead region and an innerliner at the interior surface of the tire. Each load bearing sidewall comprises a first crescent-shaped reinforcing member disposed to the outside of the innerliner portion. An inner carcass layer is disposed to the outside of the first reinforcing member to extend from sidewall to sidewall and radially inward so that each edge of the inner carcass layer wraps around a respective bead core to form a turned up carcass portion. An inner sidewall supporting complex is disposed to the exterior of the inner carcass layer. The supporting complex includes first and second partial carcass layers extending from a respective bead core to a lapping arrangement with the tread reinforcing package, a second crescent-shaped reinforcing member located to the inside of the partial carcass layers and a filler rubber portion positioned between the first and second partial carcass layers. Finally, the load bearing sidewall includes an outer sidewall and bead protecting complex disposed to the exterior of the inner sidewall complex of the load bearing sidewall portion including a sidewall rubber, a bead support rubber and a bead protector ply to the exterior of the tire.

In a further embodiment of the invention an improved method for assembling components for making a run-flat tire is realized. The tire includes a pair of bead cores axially spaced apart associated with a rim, a tread positioned radially outside the bead cores for contacting a ground surface, a tread reinforcing package interior to the tread portion, a pair of self-supporting sidewalls each extending radially between a respective bead core and a respective axial edge of the tread reinforcing portion and an innerliner ply interior to the run-flat tire. The improvement comprises the following steps. In a first step the method includes establishing a plurality of reference planes associated with a tire building drum being normal to the axis of a green tire. The reference planes include at least a pair of bead reference planes each associated with a respective bead core and a pair of shoulder reference planes each associated with a respective lateral edge of the tread reinforcing package. The reference planes are to be used for assembling the components of the green tire on the drum. A second step includes placing the innerliner ply around the building drum to extend generally from one bead reference plane to the other bead reference plane. A third step includes providing a pair of first crescent-shaped reinforcing members each placed around the drum to be radially outside the innerliner ply and located in a lapping arrangement with a respective shoulder reference plane. In a fourth step the method includes providing an inner carcass layer with generally parallel reinforcing members to provide a radial tire carcass and placing the inner carcass layer around the drum to extend axially outside of the one bead reference plane to a location axially outside the other bead reference plane. A sixth step includes providing a pair of pre-assembled inner sidewall supporting complexes of the self-supporting sidewalls each formed as a unit and including a second crescent-shaped reinforcing member, a first partial carcass layer affixed to one side of the second reinforcing member, a filler rubber portion having one side affixed to an outer side of the first partial carcass layer and a second partial carcass layer affixed to an outer side of the filler rubber portion. A seventh step includes placing each one of the supporting complexes around the drum to the outside of the inner carcass layer such that the second crescent-shaped reinforcing member contacts the inner carcass layer and the first and second partial carcass layers each extend in a lapping arrangement with a respective shoulder reference plane and the filler rubber portion is also in a lapping arrangement with the respective shoulder reference plane as well as the bead reference plane. In an eighth step the method includes placing a respective bead core around the drum at each bead reference plane to be radially outside of and in contact with a respective filler rubber portion. A ninth step includes folding both a filler end portion of each filler rubber portion and a turned up carcass portion at each edge of the inner carcass layer around a respective bead core to encircle the respective bead core. A tenth step includes providing a pair of pre-assembled sidewall and bead protecting complexes each formed as a unit and including a sidewall rubber, a bead support rubber affixed to an end of the sidewall rubber and a rim protector ply affixed to the bead support rubber. In an eleventh step the method includes placing each one of the sidewall and bead protecting complexes around the drum to contact the radial outside surface of the supporting complex to extend from an end axially outside the respective bead reference plane to the other end axially outside the respective shoulder reference plane. A twelfth step includes folding each bead support rubber inwardly around a respective bead core to encircle the respective bead core and contact an inner surface of the innerliner ply. In a thirteenth and final step the method includes removing the previously assembled components of the previous steps as a green tire portion from the building drum, forming the green tire portion into a toroidal shape and placing the tread reinforcing package and the tread portion in contact with the radially outside crown region of the green tire portion to extend between shoulder reference planes, wherein a green run-flat tire has been formed for curing in a tire mold to make the run-flat tire in the same lapsed time required to make an identical tire without the self-supporting sidewalls.

BRIEF DESCRIPTION OF THE DRAWINGS

The foregoing and other objects and features of the present invention will be more clearly understood and apparent to those skilled in the art to which the present invention relates from reading the following description and specifications thereof and when incorporated with the accompanying drawings in which.

DETAILED DESCRIPTION OF THE PREFERRED EMBODIMENTS

The features of the run-flat tire of this invention include the load bearing sidewall portions each having crescent-shaped reinforcing members interposed with carcass layers. One of the essential three reinforced carcass layers extend the full width and depth of the tire from bead to bead and wrap around the bead core to extend radially outward into the tire's sidewall. The other two carcass layers each have two portions where each portion extends from a bead core radially outward to a lapping arrangement with a tread reinforcing package. These portions provide two partial carcass layers on each side of the tire within the sidewall having reinforcing cords. The bias of carcass reinforcing cords from a radial plane is determined by the vehicle application. The run-flat tire is a radial tire having carcass reinforcing bias angles from about 75 degrees to 90 degrees. Other structural features in combination with the unique sidewall supporting complexes and the sidewall protecting complexes include: a tread reinforcing or belt package; a pair of bead regions each having a relatively high modulus bead core; a rubber tread for contacting the supporting surface; and a rubber innerliner for maintaining air within the tire during normal operation of the tire before the tire becomes deflated. The run-flat tire is for mounting on a rim of a vehicle wheel to be inflated during normal operating conditions of the vehicle.

Figure 1:
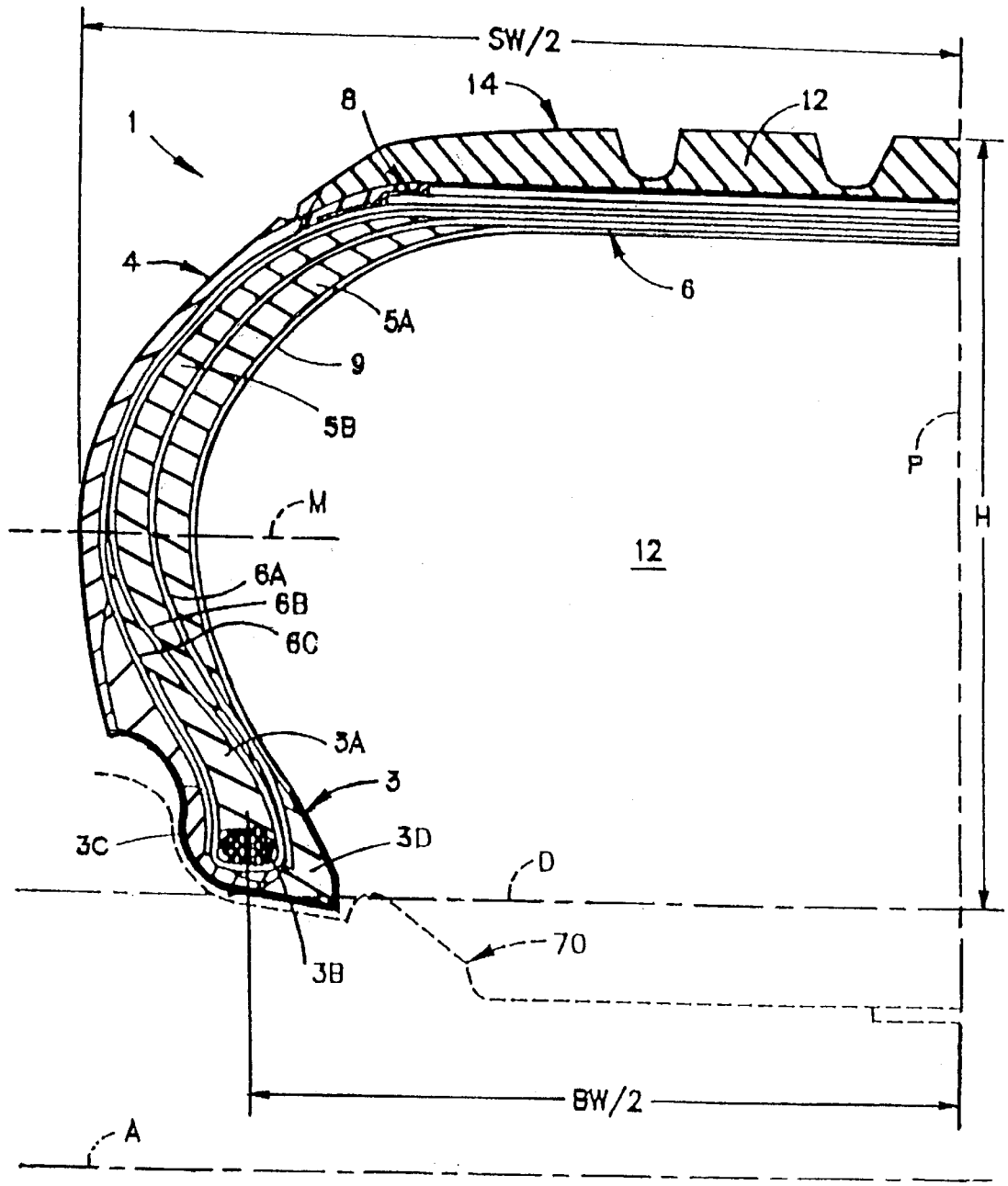
FIG. 1 is a partial cross-sectional view of a run-flat tire inflated and mounted on a rim according to the prior art.

The type of run-flat tires disclosed in this invention have load supporting sidewalls. A typical run-flat tire of this type is disclosed in U.S. Pat. No. 5,427,166, which is hereby incorporated by reference; whereby FIG. 1 illustrates a tire 1 incorporating many of the elements of a typical run-flat tire as disclosed in U.S. Pat. No. 5,427,166. This partial cross-sectional view shows half of the tire with the other half being essentially identical with respect to the midcircumferential plane P. The sidewall 4 of this tire 1 has a pair of crescent-shaped reinforcing members 5A and 5B that extend from the edge of the belt package 8 to the bead area 3. Three carcass layers 6A, 6B and 6C of the carcass 6 extend from one bead area 3 to the opposite bead area. The inner carcass layer 6A divides the first crescent-shaped member 5A from the second crescent-shaped member 5B. The sidewall 4 is outside the middle and outer carcass layers 6B,6C and an innerliner ply 9 is interior to the first crescent-shaped reinforcing member 5A. The crescent-shaped members extend radially outward and axially inward to lap over the lateral edge of the belt package 8. The bead reference D establishes a reference for defining the section height H of the tire. The rim width BW is defined from center to center of the bead cores 3B. The radial extent of the bead filler 3A and the middle carcass layer turn up are defined with regard to a percent of the section height H of the tire 1. A bead seat rubber 3C and a rubber toe portion 3D help support the bead core 3B and hold the tire on the rim 70. The tread portion 14 has a tread rubber 12 outward of the belt package 8 for making contact with a supporting surface (not shown)to support the tire and the vehicle.

Figure 6:
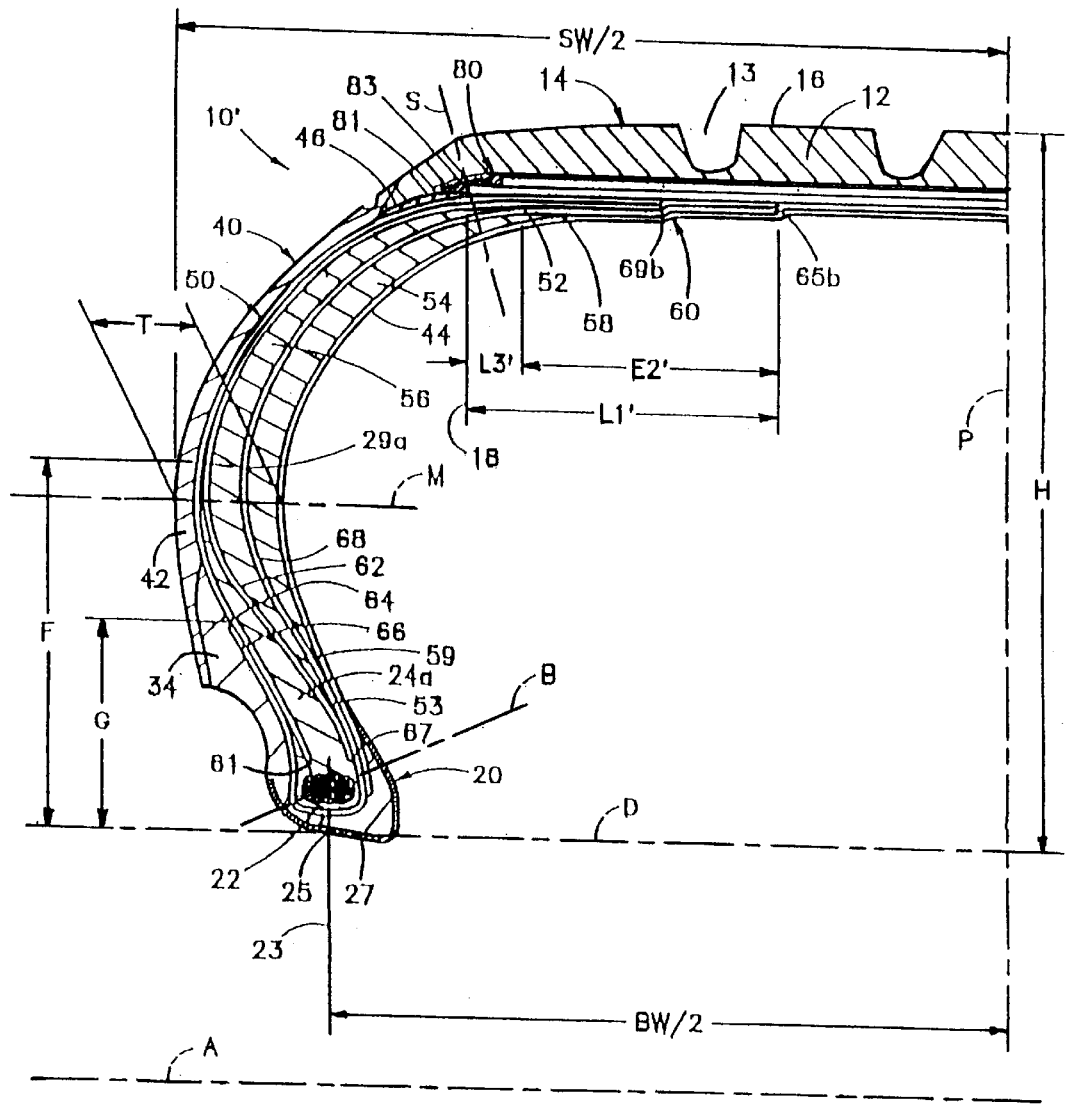
FIG. 6 is a partial cross-sectional view of a cured run-flat tire illustrating the relative position of the components within the tire after curing the tire in a tire mold to provide another embodiment of the run-flat tire of this invention.

The prior art tires are difficult and time consuming to manufacture as a result of the many components contained within the sidewalls of these run-flat tires. The prior art run-flat tires have been simplified to provided run-flat tires of this invention, as illustrated in FIG. 6. The sidewalls of the run-flat tires of this embodiment of invention have essentially the same components for providing support with loss of inflation pressure as the prior art tire of FIG. 1. However, the present run-flat tire has two partial carcass layers 62 and 64 which do not extend the full width of the crown section under the tread reinforcing package 80. In addition, both of these partial carcass layers are terminated near the bead core 22 in the bead region 20. A inner carcass layer 68 extends from bead to bead with ends that wrap around each bead core to provide a turn-up carcass portion 66.

Figure 4:
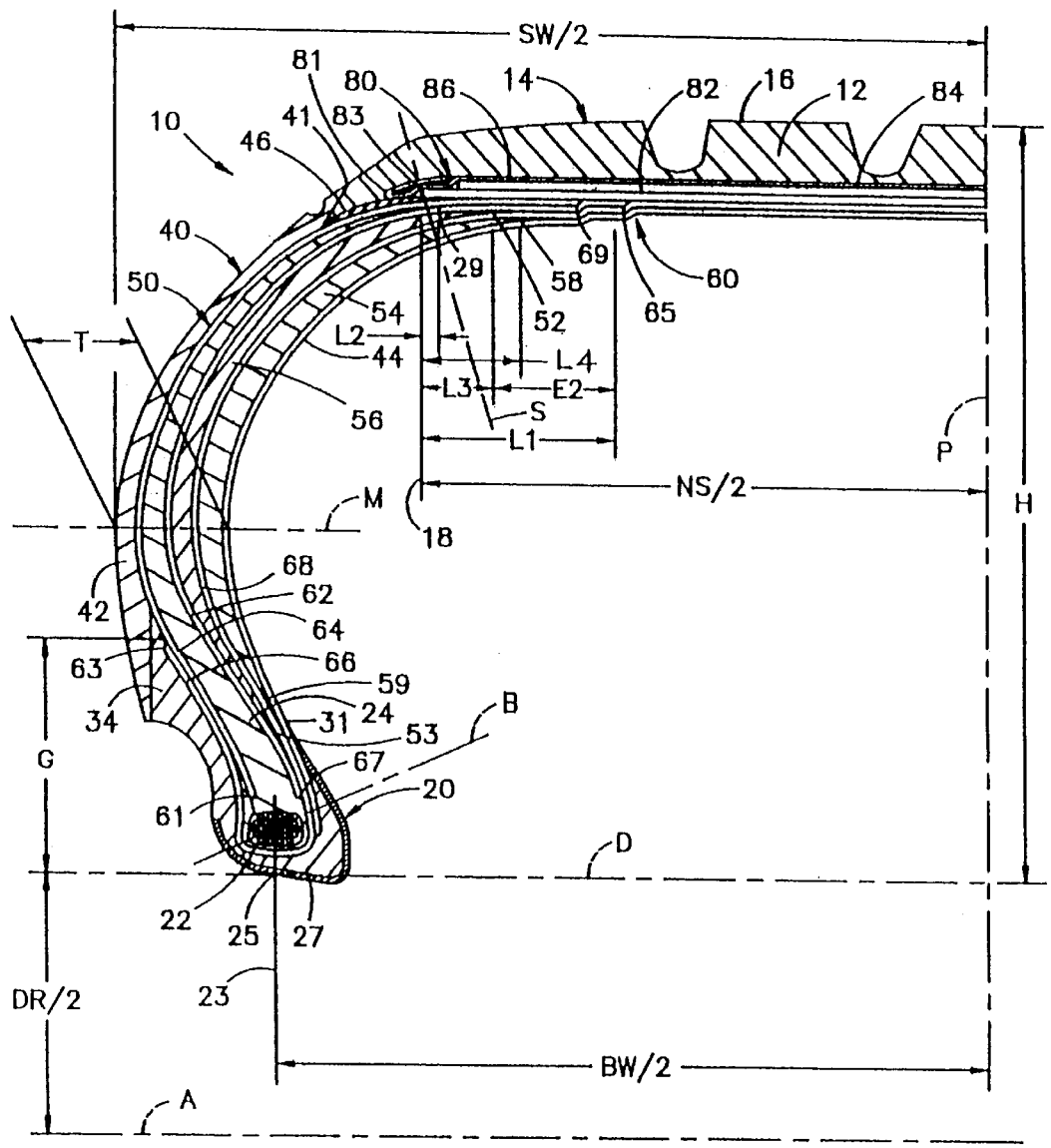
FIG. 4 is a partial cross-sectional view of a cured run-flat tire illustrating the relative position of the components within the tire after curing the tire in a tire mold to provide the preferred embodiment of the run-flat tire of this invention.

The run-flat tires of this invention have partial carcass layers as illustrated in the embodiments of FIGS. 4 and 6. These partial carcass layers provide the necessary means for run-flat tires to be manufactured with increased efficiency, without a compromise in performance. The following sections further define the structure and procedures necessary to achieve the objects of this invention.

Figure 2:
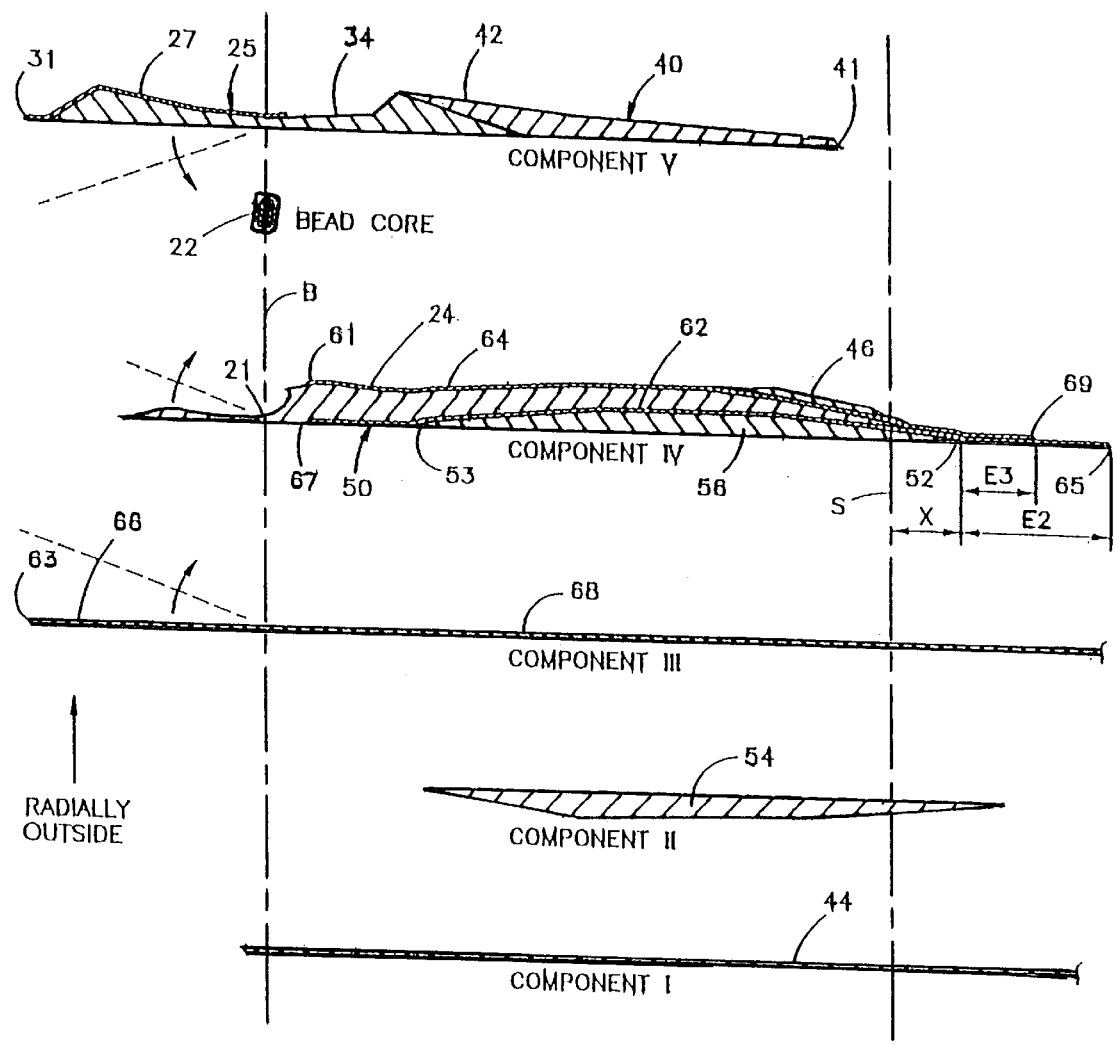
FIG. 2 is a series of five cross-sectional views illustrating the various components (#1 to #5) included in the sidewall of the run-flat tire prior to assembly of a green tire according to the invention.

Manufacturing efficiency in building the run-flat tire is greatly enhanced by considering the self supporting sidewalls to have five components plus the bead core, as illustrated in FIG. 2. The five components are arranged as they exist in the run-flat tire radially outward from the innerliner ply 44 (component 1) to the sidewall protecting complex 40 (component 5). Each one of these five components is considered as a single unit in forming the green run-flat tire during the tire building process. Relative locations of the components in a cross-section can refer to either or both a bead reference plane B and a shoulder reference plane S; both planes being perpendicular to the cross-section. The bead reference plane is defined as a plane through the center of a respective bead core 22 normal to the interior surface of the cured run-flat tire, as illustrated in FIGS. 4 and 6. The shoulder reference plane is defined as a plane from a respective end 83 of the inner belt 82 of the tread reinforcing package 80 normal to the interior surface of the cured run-flat tire, also illustrated in FIGS. 4 and 6.

Referring to the components illustrated in FIG. 2 for one sidewall of the run-flat tire from the inside radially outward as the components are assembled, the most inward component (I) is the innerliner ply 44. The innerliner ply extends from bead to bead to terminate adjacent a respective bead reference B. The second component (II) is a first crescent-shaped reinforcing member 54 that extends to a lapping arrangement with the shoulder reference S. The third component (III) is an inner carcass layer 68 that extends from bead to bead to wrap around a bead core 22 and provide a turned up carcass portion 66. However, the bead core is not assembled until the fourth component is in place. The fourth component (IV) is a sidewall supporting complex 50 that also wraps around the bead core 22 along with the inner carcass layer 68 at an end adjacent the bead reference plane B. The other end 65 of the fourth component has a lapping arrangement with the shoulder reference S. The lap distance is given by the sum of the distances X and E2 or X+E2. The fifth and most outward component (V) is a sidewall protective complex 40 that wraps downward around the bead core at one end 31 and is terminated short of the shoulder reference at the other end 41.

Both the sidewall supporting complex 50 and the sidewall protective complex 40 have sub-components. These complexes are assembled prior to the building of the green run-flat; as discussed below and illustrated in FIG. 7. Sub-components of the supporting complex 50 include the second crescent-shaped reinforcing member 56, the first partial carcass layer 62, the filler rubber portion 24, the second partial carcass layer 64 and the belt edge protector 46. The sub-components of the protective complex 40 include the sidewall rubber 42, the bead support rubber 34 and the bead protector ply 27. The bead core 22 is positioned on the supporting complex 50 at a bead core location point 21.

Figure 3A:
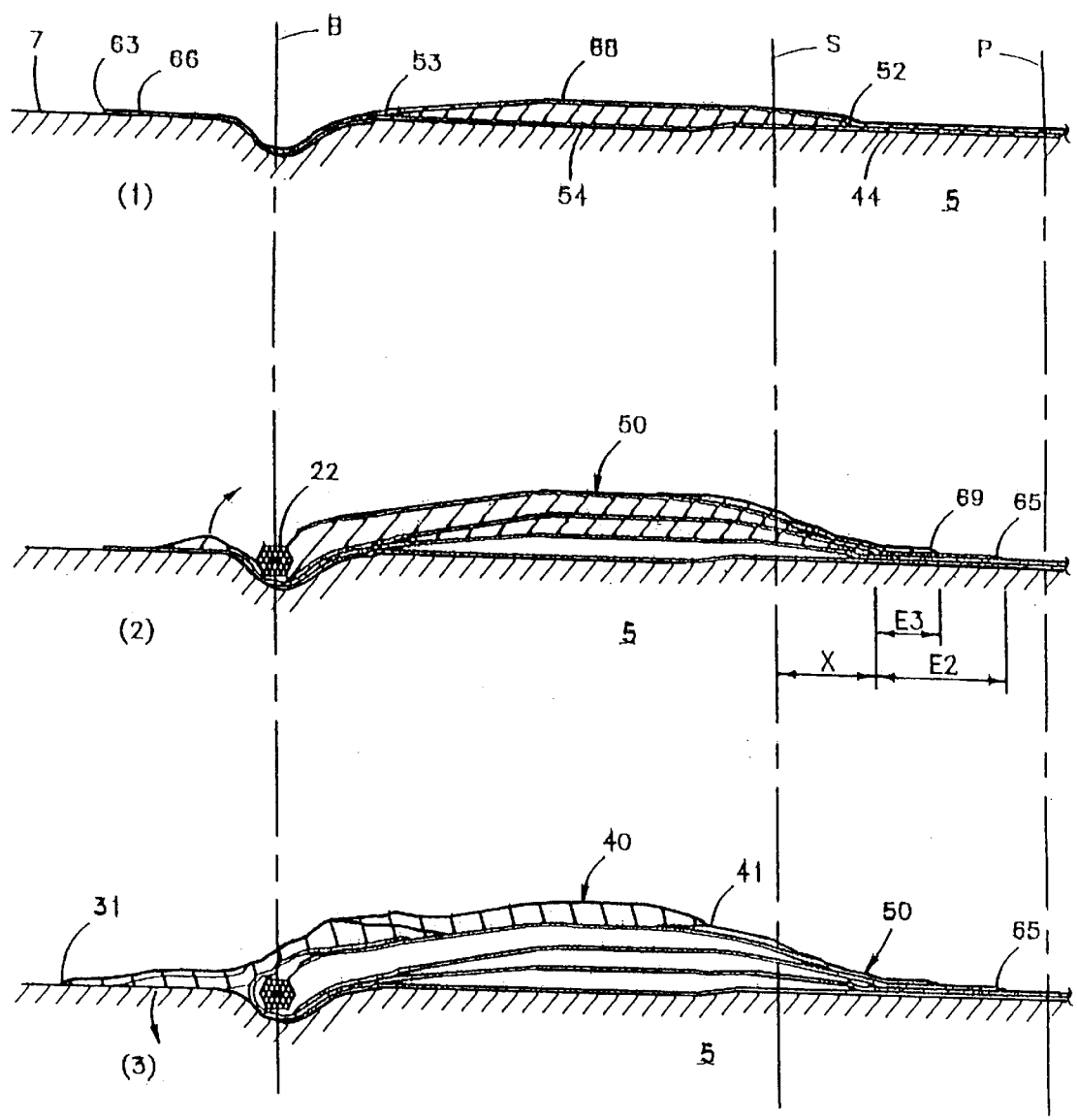
FIG. 3A is a three part sequence (1–3) of partial cross-sectional views illustrating the sidewall components of the green run-flat being combined on a tire building drum during assembly of the tire according to the invention.

Assembly of the green run-flat tire components on a tire building drum is the first step in forming the run-flat tire. Three phases or steps (steps 1–3) in this process are illustrated in FIG. 3A. In a first step (1) the innerliner ply 44, the first crescent-shaped reinforcing member 54 and the inner carcass layer 68 are placed on the tire building drum 5. The drum's surface 7 is shaped to accommodate the desired shape of the green run-flat tire. Two bead reference planes B, two shoulder reference planes S and a midcircumferential plane P can be maintained during assembly of the green run-flat tire. Only half of the assembly is illustrated in FIG. 3A. An end 63 of the turned up carcass portion 66 of the carcass layer 68 is located at an axial outer edge of the surface 7 of the drum 5. In a second step (2) the supporting complex 50 is placed on the components of step one to be in a position such that one end 65 of the complex is at a distance X+E2 from the shoulder reference plane S. The bead core 22 is also added in this second step to be at the bead reference plane B. In a third step (3) the protective complex 40 is placed on the supporting complex 50 to complete the laying of components on the tire building drum. Various end points of the various components are predetermined to be in their respective locations from the reference planes, within tolerance limits. Locations are verified to achieve a cured run-flat tire with good uniformity.

Figure 3B:
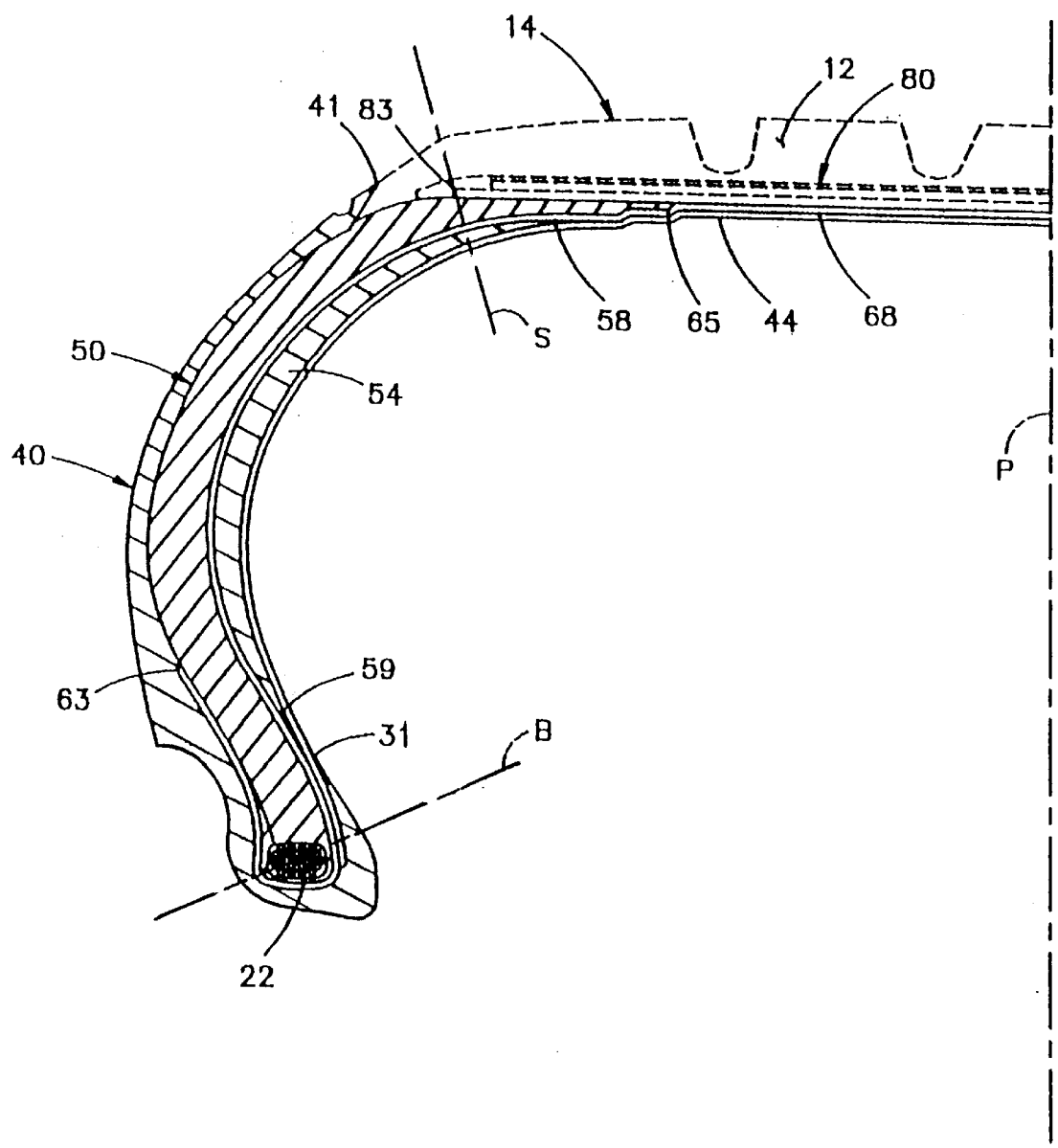
FIG. 3B is a cross sectional view of one half of a green run-flat tire of the invention illustrating the sidewall components formed into a toroidal shape during assembly of the tire prior to assembly of the tread and belt package portions of the tire.

Having assembled components of the green run-flat tire on the tire building drum the assembled product is removed from the drum and formed into a toroidal shape as illustrated in FIG. 3B. The bead reference plane B, the shoulder reference plane S and the midcircumferential plane P now form acute angles with respect to one another. The bead reference plane B continues to pass through the center of the bead core 22 and the shoulder reference plane continues to be at the end 83 of the inner belt ply of the tread reinforcing package 80. The assembled components are now in a position to receive additional components in the crown area 14 of the run-flat tire. The tread reinforcing package 80 and the tread 12 are added to the assembly to provide a completely assembled green run-flat tire. The completed green run-flat tire has been assembled with a small number of components and steps to achieve manufacturing efficiency for the total tire building process. This tire is placed in a curing press to achieve the cured run-flat tire in accordance with curing procedures generally typical in the industry.

As a result of assembling and curing the green run-flat tire with sidewall supporting structure as described by the procedures and methods of the previous discussion, a cured run-flat tire can be realized with relatively small changes in production efficiency. The cured tire which results is illustrated in FIG. 4. The overall section height H is measured from the bead reference D. The overall section width SW is measured in the maximum width median plane M. The ratio of the section height H to the overall section width SW is the aspect ratio of the tire. Aspect ratios between 0.40 to 0.65 are preferred values for the cured run-flat tire of this invention. The bead reference plane B—B and the shoulder reference plane S—S are again inclined with respect to one another in a cured tire 10. The location of the various products can be again referenced to these planes in the cured run-flat tire. The bead reference D is established by a line parallel to the axis of rotation A from the intersection of a radial line 23 from the center of the bead core 22 and the innermost surface of the bead protector ply 27 at point 25.

The basic difference between the run-flat tire embodiment of FIG. 6 and the preferred run-flat tire embodiment of FIG. 4 is the addition of a third sidewall supporting member. By extending a typical bead filler one can provide a filler rubber portion 24 which extends radially to a lapping arrangement with the tread reinforcing package 80 a lap distance L2. Therefore, each supporting sidewall includes three sidewall supporting members to include two crescent-shaped reinforcing members 54,56, and the filler rubber portion 24 as shown in FIG. 4. The run-flat tire of this preferred embodiment also has a pair of bead regions 20 axially spaced apart and each includes a bead core 22. The inner carcass layer 68 has a turned-up portion 66 which extends around the bead core 22 from inside to outside of the tire 10 to an end 63 at a distance G radially outside of the bead reference D, as illustrated in FIG. 4. The distance G is in a range of 25 to 40 percent, and preferably equal to about 35 percent, of the section height H of the tire.

The inner sidewall supporting complex 50 of this preferred embodiment run-flat tire 10 extends from the bead core 22 to overlap the tread reinforcing package 80 at both axial edges of a crown portion 14. Once again, the supporting complexes 50 each include a second crescent-shaped reinforcing member 56, a first partial carcass layer 62, a filler rubber portion 24, a second partial carcass layer 64 and a belt edge protector 46. Each supporting complex extends from the bead core 22 to a lapping arrangement with the tread reinforcing package 80. The lapping arrangement is defined by a first lap distance L1 measured in an axial direction from the end 83 of a first tread reinforcing ply 82 to an end 65 of the supporting complex 50. The first lap distance L1 has a value in the range of about 40 millimeters to about 60 millimeters for this preferred embodiment of run-flat tire 10.

The sidewall and bead protecting complexes 40 of this preferred embodiment run-flat tire 10 each extend from a position radially inside the bead core to a lateral edge of the tread 12. The protecting complexes each include a sidewall rubber 42, a bead support rubber 34 and a reinforced bead protector ply 27. The bead support rubber and the bead protector ply have been wrapped around the bead core to interface with the innerliner ply 44 to the inside of the run-flat tire at an end 31 of the protector ply.

As a result of assembling and curing the run-flat tire with the two complexes, an innerliner ply 44, the first crescent shaped reinforcing member 54 and the inner carcass layer 68 the self supporting sidewalls are formed. Two crescent-shaped reinforcing members 54 and 56 and the filler rubber portion 24 integrated with the carcass layers 62, 64 and 68 provide the load supporting capability of the deflated run-flat tire. The inner carcass layer 68 runs from bead to bead and is positioned between the first crescent shaped reinforcing member 54 and the second crescent shaped reinforcing member 56 in each sidewall of the tire. The first partial carcass layer 62 is positioned between the second crescent shaped reinforcing member 56 and the filler rubber portion 24 in each sidewall.

The overall profile of the self supporting sidewalls are shaped in a manner to provide the best equilibrium curve for generating normal and lateral forces on the tire during inflated running. A thickness T of the load bearing sidewall portion, including a sidewall rubber 42, the inner, first partial and second partial carcass layers 68,62,64, the first and second crescent-shaped reinforcing members 54 and 56, the filler rubber portion 24 and the innerliner portion 44, is approximately constant over its radial extent. First and second crescent-shaped members 54 and 56 are axially inward of the first partial carcass layer 62 and the first crescent-shaped member is in contact with the outside face of the innerliner portion 44. The self supporting sidewall thickness T is about 3 percent to about 6 percent of a section width SW of the run-flat tire 10. The crescent-shaped reinforcing members 54 and 56 along with the filler rubber portion 24 have a profile geometry including a radial thickness distribution to produce optimum inflated and deflated tire performance.

The first and second crescent-shaped reinforcing members extend to a crown points 58 and 52 respectively in the crown area of the tire to provide the lapping arrangement with the inner belt edge 83 of tread reinforcing package 80. The first reinforcing member has a lap distance L4 and the second reinforcing member has a lap distance L3 approximately equal to L4. Both lap distances L3 and L4 are at least 20 millimeters. The distance E2 from the end of the supporting complex to the end 52 of the second reinforcing member 56 of the supporting complex is given by the difference between lap distance L1 and lap distance L3 or E2=L1–L3 (see FIGS. 2, 3 and 5). The a E2 is at least 10 millimeters. The axial distance E2–E3 between the end 65 of the first partial carcass layer and the end 69 of the second partial carcass layer is at least 5 millimeters. The reinforcing members 54 and 56 extend radially inward to end points 59 and 53 radially outward of the bead core 22. The properties of these crescent-shaped members are discussed later.

The belt package 80 is located radially outward of the carcass layers 62, 64 and 68 in the crown portion 14 of the run-flat tire 10. In the preferred embodiment of this invention, the belt package has a wide inner belt 82 and at least one narrower outer belt 84 (FIG. 4). A cap ply 86 has a width to axially extend beyond both lateral edges 83 of the innermost belt 82 to a outer lateral edge 81. The cap ply may have its lateral edges modified to increase its durability. These belt components allow the lateral areas of the crown portion 14 to be more compliant in compression, which improves the endurance of the tire when running deflated. This results in a redistribution of the load so that the tread 12 at its two shoulder regions can fully support the loads from the self supporting sidewalls when the run-flat tire is running deflated.

By providing end positions 52 and 53 of the second crescent-shaped reinforcing members as illustrated in FIG. 4, the performance of the run-flat tire can be further adjusted for vehicle suspension variations. The preferred tire end positions 58 and 59 of the first crescent-shaped member adjacent are as shown in FIG. 4. The radially outward end position 58 is located axially inward of the lateral end 83 of the belt package 80 a distance of at least 20 millimeters. The rubber filler portion 24 starts at the bead core 22 and extends radially outward to an end location adjacent the lateral end of the belt package 80.

Other embodiments of the run-flat tire of this invention are realized by changing the relative size and extent of the various components comprising the inner sidewall supporting complex 50. Exemplary changes are illustrated in FIGS. 5a through 5e to the preferred supporting complex 50 illustrated as component IV of FIG. 2. The change illustrated in FIG. 5a is for the filler rubber portion 24a having been changed to have an apex 29a located approximately mid-distance between the bead reference plane B—B and the shoulder reference plane S—S. This supporting complex used in a run-flat tire will give the run-flat tire of FIG. 6, which is further discussed in more detail in a later section of this description. For the embodiment illustrated in FIG. 5b the filler rubber portion 24b has been truncated short of the bead reference plane B—B. This embodiment is necessary when tire building means are not available for turning up the filler around a bead core.

Another embodiment of an inner sidewall supporting complex 50 is illustrated in FIG. 5c. In this embodiment the first partial carcass ply 62a has been extended such that its end 65a approaches the midcircumferential plane P—P. The end 65a is at an offset distance ES from the mid circumferential plane P—P. In addition, the second partial carcass layer is extended to an end 67a for wrapping around the bead core to thereby provide a second turned up carcass portion. Either one or both of the changes illustrated in FIG. 5c can be realized as desired. The embodiment of the supporting complex illustrated in FIG. 5d includes both the first and second partial carcass layers having ends 65b and 69b respectively extended axially toward the midcircumferential plane P—P. This embodiment may be necessary to avoid terminating end 65b and/or end 69b under a circumferential groove in the tread 12 of the run-flat tire.

A fifth change in the supporting complexes 50 is illustrated in FIG. 5e to provide another embodiment of the invention. A larger second crescent shaped reinforcing member 56a is provided to better support the sidewalls of the tire. Both ends 52a and 53a are extended axially beyond their previous axial extent in making this change. The ends 65c and 69c of the partial carcass layers have also been extended to maintain carcass end distances E2 and E3 as illustrated. The distance between an end 65–65c of the first partial carcass layer and a respective end 69–69c of the second partial carcass layer, defined by the distance E2–E3, is at least 5 millimeters in each supporting complex.

All of the embodiments resulting from changes in the inner sidewall supporting complexes can be assembled in the same manner as previously described. Only small changes in one tire building process are required to provide a class of run-flat tire embodiments within the scope of the present invention. Limitations on the use and extent of the components of this run-flat tire define a distinct and separate invention with a class of run-flat tires having some variations, although limited.

Figure 7:
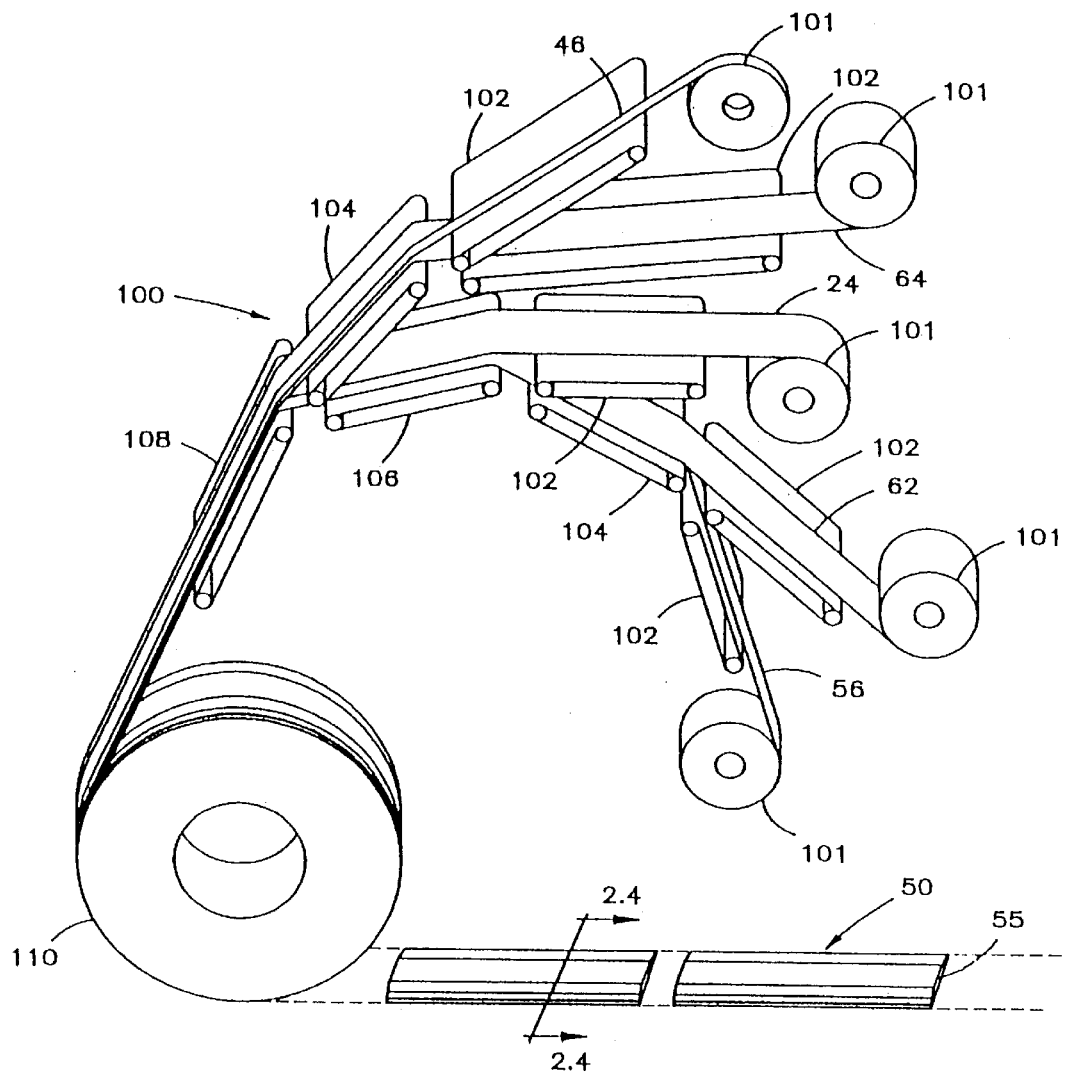
FIG. 7 is an perspective view of an apparatus for forming sidewall supporting complexes according to the invention.

A system and apparatus for automatically or semi-automatically assembling the inner sidewall supporting complex 50 is illustrated in a generic manner in FIG. 7. A system of five spools 101 is provided in which each spool contains one component of the inner sidewall supporting complex. A spool is provided for each of the components being assembled to include a belt edge protector 46, a second partial carcass layer 64, a filler rubber portion 24, a first partial carcass layer 62 and a second crescent-shaped reinforcing member 56. A continuous length of each component is rolled up on a spool to be unrolled during the assembly of the complex. An initial set of conveyors 102 support the products as they are discharged from the rollers 101. A second set of conveyors 104 support two components being placed together as a unit. The belt edge protector 46 is placed together with the second partial carcass layer 64 and the second partial carcass layer 62 is placed together with the second reinforcing member 56. A third conveyor 106 supports three products when combining the filler rubber portion 24 with the previously combined first partial carcass layer and the second reinforcing member. The final conveyor 108 supports the complete combination of all five components of the supporting complex 50.

Figure 5:
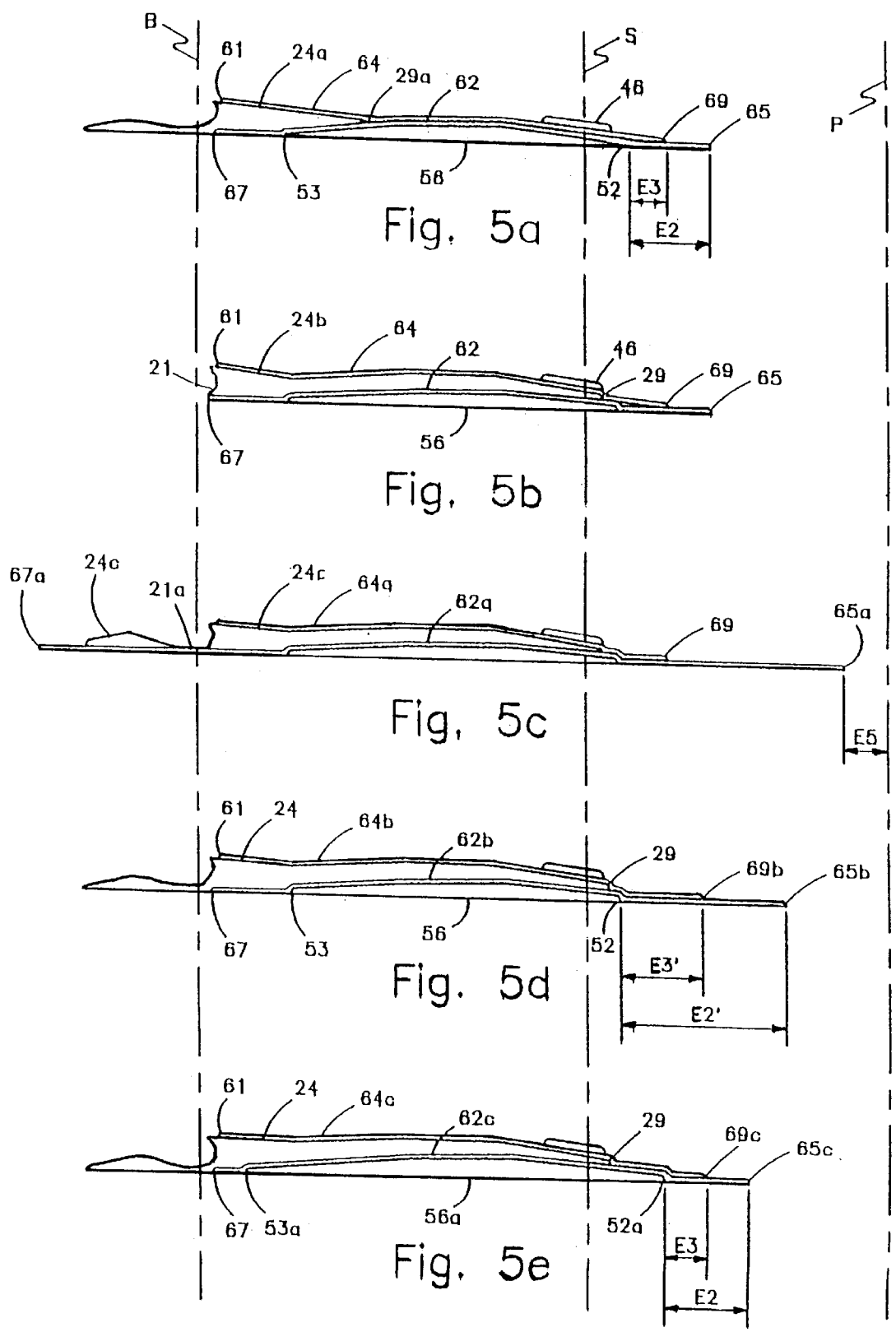
FIGS. 5a to 5e are five cross sectional views each illustrating one embodiment of a sidewall supporting complex being one component of the sidewall (FIG. 2 component #4) showing the relative extent and size of sub-components complexed together for forming the green tire of this invention.

The inner sidewall supporting complex 50 is assembled for storage on a large spool 110, as illustrated in FIG. 7. The spool is transferred to the tire building drum for making the green tire (FIG. 3A). The supporting complex is unrolled from the large spool and cut to length for a particular tire type and size being made. A typical supporting complex, when viewed as a cross-sectional cut along line 2.4 of FIG. 7, has a configuration as illustrated by component 4 of FIG. 2. Other shapes and sizes of the components of the supporting complex are within the scope of this invention, as illustrated in FIG. 5. The supporting complex is treated the same as any other single component when the green tire is being formed. The supporting complex 50 has a single planar cut 55 to provide a predetermined length, as illustrated in FIG. 7. This planar cut provides the tire builder with only a single joint to be formed when building the green tire on the tire building drum. The tire can be made more uniform with one joint instead of five joints; being one for each component of the complex. This improves the quality of the run-flat tire produced.

The outer sidewall protective complex 40 is assembled using the same type system and apparatus as described above for the supporting complex 50. Spools to include the sidewall rubber 42, the bead support rubber 34 and the bead protector ply 27 are used along with conveyors for assembling the protective complex 40. The protective complex is placed on a large spool for transporting to another location where the green tire is being formed. The protective complex is also cut to length along a single plane at each end for providing the tire builder with only a single joint to be formed when building the green tire on the tire building drum. This single joint instead of three joints for the three protective complex components also improves the uniformity of the run-flat tire.

The tire of FIG. 6 has essentially the same structure and is manufactured with the same steps in the method of manufacturing as the run-flat tire of FIG. 4. This run-flat tire has only two sidewall supporting components (first and second crescent shaped reinforcing members) that extend the full radial extent of the sidewall. This is a result of using the inner sidewall supporting complex of FIG. 5a. The filler rubber portion 24a contacts the outermost surface of the bead core 22 and has an apex 29a that extends a distance F radially outward of the bead reference D. The filler rubber portion 24a is contoured to provide a bead filler commonly known in the industry. The bead filler 24 extends a distance F in a range of 45 to 60 percent, and preferably about 55 percent, of the section height H of the run-flat tire 10'. The first and second partial carcass layers 62 and 64 have also been extended in the crown area to terminate axially away from the axial extent of the circumferential groove 13 of the tread 12. This change places ends 65b and 69b in a relationship corresponding with the supporting complex illustrated in FIG. 5d. The carcass end distance E2' of this run-flat tire embodiment has a value of at least 20 millimeters.

Material properties of the run-flat tire are critical to the endurance and other performance properties of a run-flat tire. Material properties preferred for the embodiments of the run-flat tire in this invention are defined in the following paragraphs. The run-flat tire of this invention can be constructed with only a limited number of components as well as manufacturing steps.

The rubber in the tread rubber portion 12 and a sidewall rubber portion 42 may be of any suitable compound based on natural or synthetic rubber or any suitable combination thereof known in the art. The innerliner portion 44 is preferably of a halobutyl rubber.

The crescent-shaped reinforcing members 54 and 56 and the filler rubber portion 24 can have the same material property or three different material properties. The two crescent-shaped reinforcing members 54 and 56 as well as the filler rubber portion 24 are preferably made of substantially identical materials to further enhance the ease of manufacture in the tire building operation. Harder rubber first and second crescent-shaped members 54 and 56 can support the same load on a reduced cross-sectional area and thereby effectively decreases the total mass of the tire required to support the load of the vehicle.

The first and second crescent-shaped members 54 and 56 have a Shore A hardness in the range of approximately 70 to 90 and a modulus of elasticity in compression at a ten percent unit strain in a range of approximately 7.0 to 15.0 MPa. The preferred Shore A hardness of the first and second crescent shaped members 54,56 is approximately 75 to 80 and their preferred modulus of elasticity is about 8.5 MPa. The first, second, and third crescent-shaped reinforcing members exhibit a relatively low hysteresis. The filler rubber portion 24 is a continuation of a bead filler located axially outward of the first partial carcass layer 62. It has a Shore A hardness in the range of approximately 70 to 90 and preferably 75 to 80 and a modulus of elasticity in compression at a ten percent unit strain in a range of approximately 7.0 to 15.0 megaPascals (MPa) and preferable equal to about 8.5 MPa. For a filler rubber portion 24a as illustrated in FIG. 5a and FIG. 6 the modulus of elasticity in compression at a ten percent unit strain can be in a range of approximately 7.0 to 60.0 megaPascals (MPa). Based on actual performance results the preferred embodiment of this invention is with the crescent-shaped reinforcing members 54 and 56, along with the filler rubber portion 24, having essentially the same material physical properties.

Reinforcing members of the inner belt 82 are preferably of an metallic (i.e. steel) material. Reinforcing members in each of the outer belts 84 can be of an aromatic polyamide or preferably a metallic (i.e., steel) material. Belt reinforcing members are at an acute angle (16 to 30 seconds) with respect to the midcircumferential plane P of the tire. The cap ply 86 has reinforcing members preferably of a polyamide multi-filament (i.e., nylon) material which are approximately parallel to the midcircumferential plane. Other belt package and cap ply materials that maintain structural integrity of the tire may be used for the reinforcing members within the scope of this invention.

The load supporting components (crescent-shaped members, rubber filler portion and carcass layers) cycle from tension to compression and back to tension as the tire rotates and the tread 12 of the crown portion 14 contacts the ground surface. Therefore, crescent-shaped members, the filler rubber portion and the carcass layers having both excellent tensile and excellent compression strength properties are preferred. The tension and compression physical properties of most non-reinforced rubber products used in tires are known to be approximately equal. The tensile strength properties of the carcass layers are much better than its compressive strength properties. Some reinforcing members are much better in compression than others. The reinforcing members for the carcass layers are cords made of any suitable material from the group consisting of nylon, rayon, aromatic polyamide and polyethylene napthalate. The preferred reinforcing members of the carcass layers are made of rayon. A hybrid reinforcing member which is more stable at higher temperatures is also within the scope of this invention. The reinforcing members of the first partial carcass layer 62 and the inner carcass layer 68 are supported by the adjacent crescent-shaped reinforcing members 54 and 56 and the filler rubber portion 24. Therefore, they have an increased compressive strength as a result of this confinement.

The strength (modulus of elasticity) in compression of the first partial carcass layer 62 and the inner carcass layer 68 in the direction of the reinforcing members can have a value from about 55 megaPascals (MPa) to about 95 MPa using a 1840 decitex 2 ply rayon reinforcing material. The rubber skim on the carcass layers are of a material standard in the industry. The preferred modulus of elasticity in compression for the first partial carcass layer and the inner carcass layer is at least 75 MPa for the preferred rayon material.

A critical performance parameter of the deflated run-flat tire is its ability to stay on the rim. The physical property of materials in the bead area are important for achieving this performance. The bead rubber seat portion has a preferred tension modulus of elasticity at 10 percent strain in a range of approximately 45 to 60 MPa. Other components such as the crescent-shaped reinforcing members 54 and 56, and the filler rubber portion 24 are also important, but somewhat less critical, in keeping the run-flat tire on the rim. However, all of these physical features and properties contribute to the run-flat performance of the tire of the invention.

Experimental Results

The run-flat tire of this invention provides reductions in the vehicle's unsprung mass, rotating mass and rolling resistance for improving vehicle performance over previously designed run-flat tires which did not have the complexed components of the present invention. In particular, on-vehicle performance improvements were observed when the two carcass layers in the center of the crown area under the tread reinforcement package were eliminated by the tire of this invention. In addition, tire mass has a direct influence on the vehicle's ride comfort. The tire is a part of the unsprung mass of the vehicle. Small reductions in the unsprung mass can provide a significant improvement in both ride comfort and handling of the vehicle. Vehicle ride was improved by the reduction of the unsprung mass for the run-flat tires of this invention. The vehicle's fuel economy is improved by both the rolling resistance and rotating mass of the tire. The following Table indicates the mass and rolling resistance advantages obtained for a P225/60 R16 run-flat tire of this invention (FIG. 4), when compared with a run-flat tire of the same size but without the complexed components of the present invention (i.e., the run-flat tire of U.S. Pat. No. 5,511,599).

TABLE

| | Mass and Rolling Resistance Advantages | |
|---|---|---|
| P225/60 R16 Parameters | OTHER RUN-FLAT TIRE | TIRE OF THIS INVENTION |
| % Mass Change | 1.00 (ref.) | 0.97 |
| Rotating Mass | reference | −10 kilograms |
| Rolling Resistance | 1.00 (ref.) | 0.99 |

Improvements in the productivity of the P225/60 R16 run-flat tire of this invention were also achieved. By reducing the number of components assembled on a tire building drum, the production time was reduced to as much as one half in comparison with the time to assemble the other run-flat tire on the tire building drum. The reduction in the number of components was realized by combining several interior sidewall components into two inner sidewall supporting complexes and several exterior sidewall and bead area components into two outer sidewall and bead protecting complexes. Both of these complexes were made with a single joint for reducing the variability of tire's uniformity characteristics. The result was a higher percentage of the run-flat tires being in compliance with predetermined uniformity requirements for run-flat tires. Fewer joints also resulted in improvements in ride quality for the tires examined.

From the above description of the preferred embodiments of the invention, those skilled in the art will perceive other improvements, changes and modifications within the skill of the art which are essentially covered by the appended claims.

What is claimed is:

1. An improved method for assembling components for making a run-flat tire in a nominal lapsed time, said tire including a pair of bead cores axially spaced apart associated with a rim, a tread positioned radially outside said bead cores for contacting a ground surface, a tread reinforcing package interior to said tread portion, a pair of reinforced self-supporting sidewalls each extending radially between a respective bead core and a respective axial edge of said tread reinforcing portion and an innerliner ply interior to said tire, said improved method comprising the steps of:

a) establishing a plurality of reference planes associated with a tire building drum being normal to the axis of a green tire, said reference planes to include at least a pair of bead reference planes each associated with a respective bead core and a pair of shoulder reference planes each associated with a respective lateral edge of said tread reinforcing package, said reference planes to be used for assembling said components of said green tire on said drum;

b) placing said innerliner ply around said building drum to extend generally from one bead reference plane to the other bead reference plane;

c) providing a pair of first crescent-shaped reinforcing members each placed around said drum to be radially outside said innerliner ply and located in a lapping arrangement with a respective shoulder reference plane;

d) providing an inner carcass layer with generally parallel reinforcing members to provide a radial tire carcass and placing said inner carcass layer around said drum to extend from axially outside of said one bead reference plane to a location axially outside said other bead reference plane;

e) providing a pair of pre-assembled inner sidewall supporting complexes of said self-supporting sidewalls each formed as a unit and including a second crescent-shaped reinforcing member, a reinforced first partial carcass layer affixed to one side of said second reinforcing member, a filler rubber portion having one side affixed to an outer side of said first partial carcass layer and a reinforced second partial carcass layer affixed to an outer side of said filler rubber portion;

f) placing each one of said supporting complexes around said drum to the outside of said inner carcass layer such that said second crescent-shaped reinforcing member contacts said first carcass layer and said first and second partial carcass layers each extend generally from a respective bead reference plane to a lapping arrangement with said respective shoulder reference plane;

g) placing a respective bead core around said drum at each bead reference plane to be radially outside of and in contact with a respective filler rubber portion;

h) folding both a filler end portion of each said filler rubber portion and a turned up carcass portion of each edge of said inner carcass layer around a respective bead core to encircle said respective bead core;

i) providing a pair of pre-assembled sidewall and bead protecting complexes each formed as a unit and including a sidewall rubber, a bead support rubber affixed to an end of said sidewall rubber and a rim protector ply affixed to said bead support rubber;

j) placing each one of said sidewall and bead protecting complexes around said drum to contact the radial outside surface of said supporting complex to extend axially outside said respective bead reference plane to an end point axially outside said respective shoulder reference plane;

k) folding each said bead support rubber inwardly around a respective bead core to encircle said respective bead core and contact an inner surface of said innerliner ply; and l) removing the previously assembled components of the previous steps as a green tire portion from said building drum, forming said green tire portion into a toroidal shape and placing said tread reinforcing package and said tread portion in contact with the radially outside surface in a crown region of said green tire portion to generally extend between shoulder reference planes, wherein a green run-flat tire sub-assembly has been formed for curing in a tire mold to make said run-flat tire in the same lapsed time required to make an identical tire without said self-supporting sidewalls.

2. The improved method set forth in claim 1 including the steps of:

providing each second crescent-shaped reinforcing member of said pair of supporting complexes having the same general shape as each first crescent-shaped reinforcing member; and placing said each first crescent shaped member around said drum to be radially outside said innerliner ply and radially inside said inner carcass layer, each said first crescent-shaped member to be aligned radially inside a respective second crescent shaped member as part of said tire sub-assembly.

3. The improved method claim set forth in claim 2 wherein said step of including a filler rubber portion in providing each supporting complex further includes the step of providing a filler rubber portion extending from said respective bead reference plane to a point axially short of said shoulder reference plane so that said filler rubber portion becomes a bead filler.

4. The improved method claim set forth in claim 1 wherein said step of including a filler rubber portion in providing each supporting rubber complex further includes the step of providing a filler rubber portion extending from said respective bead reference plane to a lapping arrangement with said respective shoulder reference plane.

\* \* \* \* \*